United States Patent [19]

Muddiman

[11] 3,989,057

[45] Nov. 2, 1976

[54] PRESSURE RELIEF SAFETY DEVICE

[76] Inventor: George Robert Muddiman, 524 Lakeshore Road, Beaconsfield, Quebec, Canada

[22] Filed: Apr. 8, 1975

[21] Appl. No.: 566,673

[30] Foreign Application Priority Data

July 25, 1974 Canada ................................ 205788

[52] U.S. Cl. .............................. 137/68 R; 220/89 A

[51] Int. Cl.[2] .......................................... F16K 17/40

[58] Field of Search ............ 220/89 A; 137/68 R–71

[56] References Cited

UNITED STATES PATENTS 1,342,667 6/1920 Dougherty et al. .................... 137/71

2,320,211 5/1943 Bloom et al. ...................... 220/89 A

FOREIGN PATENTS OR APPLICATIONS 1,011,689 7/1957 Germany ........................... 137/68 R 488,953 7/1938 United Kingdom ............... 137/68 R

*Primary Examiner*—Martin P. Schwadron

*Assistant Examiner*—Richard Gerard

*Attorney, Agent, or Firm*—Watson, Cole, Grindle & Watson

[57] ABSTRACT

A pressure relief safety device useful for operation in a low pressure range. The device utilizes a non-metallic relatively thin air-impermeable membrane extending across a housing, the latter of which is in communication with a system operable under pressure. When the pressure in the system increases beyond a predetermined threshold pressure level, the membrane will expand and contact a rupturable member which will rupture the membrane. In this way relief for the excess pressure conditions is obtained. The rupturable member is adjustably located with respect to the membrane to thereby adjust and vary the predetermined threshold pressure level.

1 Claim, 3 Drawing Figures

PRESSURE RELIEF SAFETY DEVICE

This invention relates in general to pressure relief devices, and more particularly to an improved rupture disc safety device which is adapted to operate in low pressure ranges.

Pressure relief devices, often referred to as "rupture disc safety devices" have been well known and have been usefully employed in a wide variety of applications for several years. These rupture disc safety devices basically comprise a rupture disc membrane mounted in a suitable housing. This housing is, in turn, adapted to be attached to a pressure vessel which may create a pressure system or otherwise form part of a pressure system. When the pressure in this pressure system exceeds a certain predetermined value, the rupture disc membrane is adapted to break or rupture, thereby relieving the pressure in the pressure vessel.

These rupture disc safety devices have been categorized into two major classes; the first of which comprises those devices that operate on the principle of compression loading and the second of which comprises those devices generally operating under tension loading. Nevertheless the device in either case operates in accordance with the general principles described above.

The devices of the first category, i.e. those devices whic operate with compression loading, are exemplified by Canadian Patent No. 773,387 issued to Black et al. Generally, these compression loading rupture disc safety devices include a metal rupture disc membrane. This metal membrane will initially assume a convex configuration, that is, the membrane will have a convex portion facing into the interior of the pressure vessel when the pressure in the vessel has not exceeded a predetermined threshold level. In operation, however, when the pressure in the vessel has reached or exceeded this predetermined threshold level, the rupture disc membrane will "reverse" itself with a snapping action so that it assumes a concave configuration with respect to the interior of the vessel. This reversal of position causes the metal membrane to impale itself on an associated cutting means, such as a rigid point or blade. The metal membrane is thus cut or ruptured and the pressure in the vessel is relieved.

These types of rupture disc safety devices have been found to be very satisfactory in that they can be designed so as to reverse their configuration at a fairly precise predetermined threshold pressure level. However, these devices suffer from the limitation that they are not adapted to operate in a low pressure range. Due to their mode of operation, these safety devices inherently require a relatively stiff membrane generally formed of a metal or metallic alloy which can assume a concave-convex configuration. Such a "stiff" membrane cannot be utilized when it is desirable to have a rupture disc which will operate in a low pressure range inasmuch as the concave-convex membrane requires a fairly high operating pressure to reverse itself.

The second class of rupture disc safety devices employed in the prior art have operated as described above on the principle of tension loading. Usually, this latter group of devices employ a relatively flat metallic rupture disc membrane mounted in a suitable housing. These devices are not suitable for high pressure operation as the relatively flat metallic membrane is subject to creep and fatigue after a period of operation. However, devices in this second class have found some usage in a low pressure field, with the user of the device willing to withstand the problems mentioned above.

Prior art proposals for the employment of a tension loaded rupture disc safety device in the low pressure range have generally relied upon the use of an electrical type cutting means. Thus, such previous proposals have included a device which employs a metallic rupture disc or membrane with a further metallic element mounted in close proximity thereto. This metallic element is connected to a source of electricity so that when the metallic rupture membrane expands slightly under pressure, it would contact the electrical cutting element and contact of these two members completes an electrical circuit with a resultant arc or other form of electrical discharge which ruptures the membrane.

There are several problems attendant to the use of an electrical type cutting means in these devices. One of the foremost problems associated with such prior art devices relates to the need of a proximate source of electricity. Thus, such devices are limited in their scope of use. Furthermore, there is an inherent requirement that the cutting element to be mounted in close proximity to the metallic membrane. The high tolerance levels required for insuring a close proximity between the cutting element and the metallic membrane naturally increases the cost of manufacture of these devices.

With this invention, Applicant has developed an improved rupture disc safety device which is adapted to overcome the deficiencies of the prior art devices by use of a non-metallic pressure rupturable membrane which is severable by an adjustably located cutting element.

It is therefore the primary object of this invention to provide a rupture disc safety device having an improved low pressure rupture disc membrane which is adapted to rupture or break at a fairly precise predetermined threshold pressure level and which is thereby particularly suitable to operate in the low pressure range.

More particularly, it is an object of the present invention to provide a low pressure rupture disc safety device comprising a flexible rupture disc membrane and an externally mechanically adjustable rupturing means.

A further object of this invention is to provide a low pressure rupture disc safety device which can be manufactured at a relatively low cost and which is durable and highly effective in its operation.

With the above and other objects in view, my invention resides in the novel features of form, construction, arrangement and combination of parts presently described in this specification and the accompanying claim.

Generally, the device of the present invention comprises a support means in the form of a housing with means for attaching the housing to a pressure vessel. Adjustable mounting means is operable in conjunction with a rupturing means. A supporting structure is adapted to operate in conjunction with the adjustable mounting means. The device also includes a flexible rupture disc membrane which may be ruptured by the cutting means when the pressure in the vessel exceeds or falls below a predetermined threshold pressure level. By adjusting the position of the rupturing means with respect to the rupturable membrane, it is possible to vary and adjust the predetermined threshold level.

In general terms, the device of the present invention may be described as a pressure relief safety device which comprises a support member capable of operative attachment to a system operable under certain pressure conditions. In this case, the system may adopt the form of a pressure vessel. A relatively thin non-metallic air inpermeable rupturable membrane is operatively retained by this support member. The membrane is capable of withstanding normal operating pressures in the system and has a flexible portion thereof located in a first position when the pressure condition of the system is within a predetermined threshold pressure level. This flexible portion of the membrane shifts to a second position when the pressure condition of the system traverses the predetermined pressure threshold level. A rupturing means is located to contact and rupture the membrane when the presssure conditions traverse the predetermined threshold level. Adjusting means is operatively associated with the support means and the rupture means for adjustably positioning the rupturing means to thereby adjust and vary the predetermined threshold level.

In greater detail, the rupturable membrane is initially flat when the flexible portion thereof is in the first position and is expandable to assume a somewhat arcuate shape when the pressure conditions traverse the pre-established threshold level. In a preferred aspect of the invention, the rupturable membrane is expandable to assume a somewhat concave shape with respect to the system when the pressure conditions of such system exceed the pre-established threshold level. In an alternate arrangement, the rupturable member is expandable to assume a somewhat convex shape with respect to the system when the pressure conditions of such system fall below the pre-established threshold level.

More particularly, the housing of the present invention is adapted to hold the adjustable mounting means and the housing is also adapted to be releasably and securely attached to the pressure vessel. The pressure vessel with which the device of the present invention may be used, may adopt any form, as for example, a tank-like device or, alternatively, it may comprise a conduit or essentially any other closed or partially closed system which operates under positive or negative pressure conditions. Associated with the pressure vessel are means of attaching the rupture disc safety device thereto according to conventional expedients known to those skilled in the art for this purpose. Thus, the pressure vessel may have an aperture therein adapted to receive the rupture disc safety device. In a more conventional embodiment, a conduit is provided leading from the pressure vessel and this conduit would have cooperating means of attaching the housing of the rupture disc safety device thereto.

Generally, the housing employed in the present invention may be of any material suitable for use in pressure operations of this type, as for example, metals, metallic alloys, plastics and the like. The material selected for the housing will primarily depend upon the end use of the rupture disc safety device; consideration being given to the potential treatment, the device and to the properties of liquids and/or materials or fluids which will come into contact with the device. The housing may also adopt any particular structure or shape such that it is adapted to the requirements of being releasably attachable to the pressure vessel and capable of contacting the other components forming a part thereof, as will be described hereinafter in more detail. As the conduit leading from the pressure vessel is generally of a cylindrical configuration, in a preferred embodiment of the present invention, the housing will adopt a like cylindrical configuration. In this case, the cylindrical housing will have an aperture extending therethrough for purposes which will become clear hereinafter.

The walls of the housing may be of any thickness necessary, as determined by the material employed in the housing and the intended end use of the device. As a further requirement, the housing must be capable of being secured to the conduit of the pressure vessel. Thus, a suitable attaching means must be provided with respect to the housing as discussed above, and in one embodiment, provision may be made for threads on the outside wall of the cylindrical housing in such manner that these threads are adapted to mate with threads on the pressure vessel.

It is also possible to employ attaching means such as clips or the like. In a preferred embodiment of the present invention, attaching means are located on the housing which are adapted to cooperate with further cooperating attaching means on the pressure vessel. Thus, where a conduit leads from the pressure vessel, this conduit is provided with threads on the outside wall thereof. It is preferred that the cylindrical housing has an enlarged portion at one end which defines a shoulder portion. This shoulder portion is preferably formed by an enlarged thickness of the annular wall at one end, which extends outwardly with respect to the central aperture defined by the housing. This enlarged shoulder portion forms a substantial right angle with the cylindrical wall of the housing.

According to an embodiment of this invention, there is associated with the housing a supporting structure. This supporting structure is adapted to hold the adjustable mounting means of the present invention. Also in a preferred embodiment, the supporting structure is adapted to operate in a cooperative manner with the adjustable mounting means, and this adjustable mounting means will carry the rupturing means as will be more fully described hereinafter. The supporting structure may be constructed of any suitable material, as for example, any of the materials used in construction of the housing. Although the supporting structure may be constructed as a separate entity, in one embodiment of the present rupture disc safety device, the supporting structure may be integral with the housing. Thus, in this case, the supporting structure forms a one piece unit with the housing component; the supporting structure being generally opposed to the end of the cylindrical housing adapted to be attached to the conduit of the pressure vessel.

The supporting structure may also take the form of a complete enclosure of one end of the cylindrical housing structure with apertures communicating with the external atmosphere permitting pressure release upon rupture of the rupturable disc membrane. It is, however, preferably that the supporting structure be constructed with a bar-like configuration in the form of a mounting means which is located across the enlarged central aperture of the cylindrical housing. To this end, the housing and the supporting structure may be constructed as a one piece unit of the same material. Alternatively it is within the scope of this invention to provide for means on the supporting structure to releasably and adjustably hold the mounting means, such as the use of clips or the like.

It is a further requirement that the mounting means is adapted to releasably and adjustably hold the rupturing means of the present invention.. Thus, an aperture may be provided within the mounting means. This aperture would be of a threaded nature to operate in conjunction with the threaded adjusting means on the rupturing means as will be more fully described.

As discussed above, the housing of the present invention may be adapted to be directly attached to the pressure vessel. The sole requirement is that the housing must be capable of being releasably and securably attached to the pressure vessel. Thus, as discussed, the housing may have suitable threads on the outside wall thereof which is adapted to mate with the threads on the pressure vessel. In the preferred embodiment, where the housing has a shoulder portion substantially as described above, it is preferred that there be a separate attaching means as will now be described. The particular preferred embodiment of the attaching means of the present invention comprises a nut-like device having threads which mate with the threads on the exterior wall of the conduit leading from the pressure vessel.

The rupturable disc membrane of the present invention is a one piece integral unit and must have the characteristics of being flexible with a predetermined expansion. In addition, the rupturable membrane must be air-impervious. This membrane should be strong enough to withstand the pressures employed in the pressure vessel without self rupturing and at the same time, it should be capable of breaking or rupturing when contacted with a suitable rupturing means. To this end, a preferred rupturable disc membrane, as may be employed in the present invention, would generally be formed of a plastic-like material. More specifically, it has been found that a rupturable disc membrane made of a thin sheet of thermoplastic material is quite suitable, since it is capable of meeting all the requirements discussed above. The flexible rupturable disc membrane is required to have a uniform thickness and composition so that in operation it will expand evenly in a predetermined manner and will be free of any weak areas therein. In the preferred embodiment, the disc membrane is placed between the housing and the conduit leading from the pressure vessel. To this end, a peripheral ring may be provided around the rupturable disc membrane for mounting between these components.

The adjustable mounting means such as may be employed in the device of the present invention, comprises a means for holding the rupturable means in such manner that the rupturable means may be adjustably mounted relative to the flexible rupturable disc membrane. In a preferred embodiment, as described above, the adjustable.mounting means is adapted to operate in a cooperative manner with the supporting structure of the present device.

In the preferred embodiment, the adjusting means which adjustably positions the rupturing means may have a configuration adapted to operate in conjunction with an aperture located in the mounting means. To this end, the adjusting means may have a body portion of a general cylindrical rod configuration; this cylindrical rod configuration having threads thereupon. These threads are adapted to act in a cooperative manner with the threaded aperture previously described in the mounting means. In this way, the body portion may be moved in a direction so as to adjust the distance between the flexible rupturable disc membrane and the rupturable means.

On the end of the body portion closest to the rupturable disc membrane, the rupturing means is provided for rupturing the membrane, as will be more fully described hereinafter. At the end of the body portion opposed to the rupturing means, there may be provided for means of mechanically adjusting rupturing means in relation to the supporting structure. To this end, there may be provided a head on the body portion; this head adapted to receive a mechanical tool such as a wrench in order to adjust the position of the rupturing means.

Further, there may be provided a means for holding the rupturing means in a fixed position. This may be accomplished by means of devices well known to those skilled in the art; a preferred embodiment comprising the use of a further nut-like device adapted to be mounted on the body portion of the adjusting means in proximity to the mounting means. It is also within the scope of this invention to provide for a visual calibrating device wherein it may be seen to what extent the body portion is extended in relation to the rupturable disc membrane. This may be provided for by means of calibrations on said body portion.

The use of rupturing means, as may be employed in the present low pressure rupture disc safety device, is well known to those having knowledge of the art of cutting or rupturing plastic or like materials. The rupturing means is adapted to rupture or impale the flexible rupturable disc membrane when it is expanded under pressure to contact the rupturing means. To this end, it is conventional to employ a rupturing means of a generally apex or point configuration; the apex or point portion of the rupturing means being in proximity to the flexible rupture disc. Alternatively, in a device such as the present device in which a flexible rupturable disc membrane of a plastic material is employed, the rupturing means may consist solely of a needle like device; this needle-like device being sufficient to rupture the membrane when contacted therewith. The rupturing means may comprise an integral part of the adjusting means, or the mounting means or alternatively, it may be attached to the mounting means by suitable mechanical means. The materials employed in the construction of the rupturing means are also well known in the art and include, for example, metals or metallic alloys. The important requirement is that the rupturing means presents a sharp point or edge sufficient to cut the flexible rupturable disc membrane. As indicated above, the disc membrane will flex and in effect expand as the pressure in the pressure vessel increases. Thus, the membrane may initially assume a flat position under ambient pressure condition and expand to a position where it is convex with respect to the pressure vessel when subjected to increased pressure in the vessel. When the pressure reaches a threshold level, the membrane will have expanded to a point where it contacts the rupturing means, thereby rupturing the membrane to relieve pressure in the vessel.

In a further embodiment of the present invention, the device may be adapted to cut the flexible rupturable disc membrane when there is a drop in pressure in the pressure vessel. Thus, for example, when there is a leak in the pressure vessel, of the type employed in the present invention, a vacuum will be formed within the vessel. A desirable feature of this invention is to provide a means of eliminating such a vacuum and also providing knowledge of such a leak. To this end, the present invention may include the use of a vacuum breaker assembly, this vacuum breaker assembly being placed on the side of the rupturable disc membrane in proximity to the pressure vessel.

As with the other components of the present device, the vacuum breaker assembly may be manufactured of conventional materials, subject to the requirement that since it will be in contact with the fluid within the conduit of the pressure vessel, that it be of a material adapted to withstand any corrosive or other effects of the fluid. The structure of the vacuum breaker assembly may be similiar to that employed for the rupturing means of this invention. In a preferred embodiment, the vacuum breaker assembly comprises a one-piece unit adapted to be placed between the housing and conduit from the pressure vessel. This one-piece unit will employ a second rupturing means placed in proximity to the rupturable disc membrane. The second rupturing means employed in the vacuum breaker assembly may be of an adjustable nature, in a manner similar to the first rupturing means. This however, is not an important requirement, as the second rupturing means is required only to act when there is a vacuum in the system.

There may also be provided a gasket-like device adapted to be placed between the housing and the conduit of the pressure vessel in a particular embodiment of the present invention. This gasket device is adapted to seal the junction between the housing and conduit, thus ensuring a relatively air-tight system. Such devices are well known in the art and may be of any suitable material such as rubber, plastic paper products, or the like.

Although the device of the present invention has been described with respect to operating in a low pressure range, as for example, from about one pound per square inch to about five pounds per square inch pressure, such a definition is relative and it is foreseen that a device similar to that which has been described, may equally well be employed in a higher pressure range. Furthermore, it is understood that there may be other options employed in such a device, these options being well known to those skilled in the art, such as the use of an alarm like device associated therewith so as to give notice when the rupturable disc membrane breaks.

Having thus generally described the invention in general terms, reference will now be made to a particular embodiment of the invention, as illustrated in the accompanying drawings, and in which.

Figure 1:
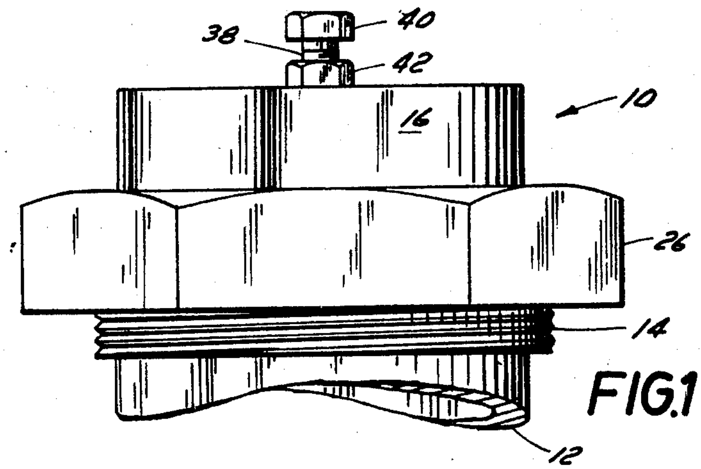
FIG. 1 is a side elevational view of a pressure relief device constructed in accordance with and embodying the present invention.
Figure 2:
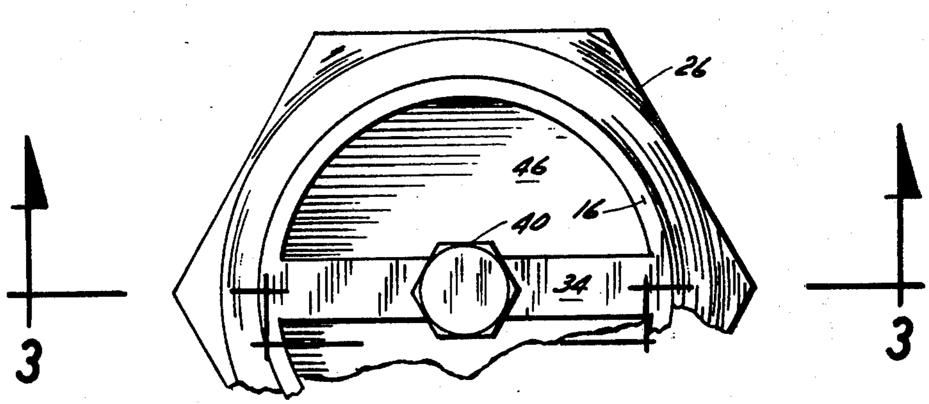
FIG. 2 is a top plan view of the device of FIG. 1, partially broken away.
Figure 3:
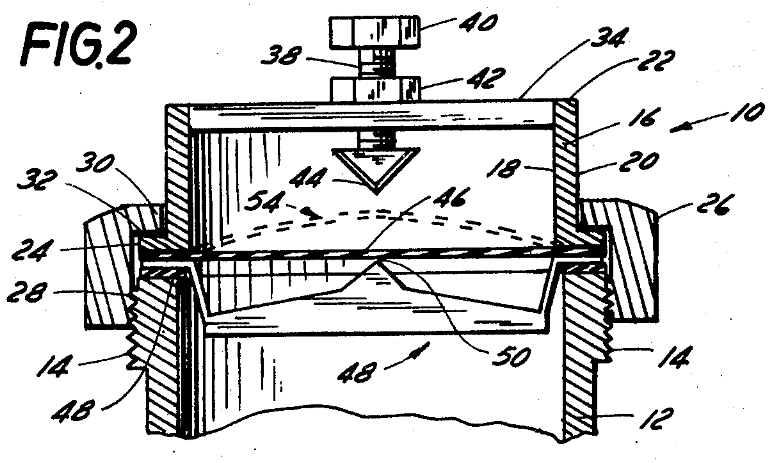
FIG. 3 is a vertical sectional view taken along the line 3—3 of FIG. 2.

Referring now in greater detail to FIGS. 1 to 3 of the drawings, there is illustrated a pressure relief safety device or so-called rupturable disc membrane device generally indicated by reference number 10. This device 10 is connected to a suitable conduit 12, and this conduit 12 leads from the pressure vessel or tank (not shown) which it is desired to have the assembly 10 attached. The conduit 12 may be of any suitable configuration, such as a generally circular configuration which is conventional in the art. Hence the shape of the rupture disc assembly will be of a similar circular configuration. Associated with the conduit 12, is a cooperating attaching means in the form of threads 14 adapted to attach the device 10 of the present invention to the conduit 12.

As shown in the drawings, a housing 16 forms part of the device of the present invention. The housing 16 may be of any suitable configuration as is well known to those skilled in the art. Thus, in the embodiment illustrated, the housing 16 is shown as having a complete cylindrical wall with inside and outside surfaces 18 and 20, respectively. The cylindrical wall is provided with an outer end 22 opposed to the end attached to the conduit 12. The material used in the construction of the housing 16 may be any conventional material in the art; thus, metals, alloys thereof, and the like may be used, as previously described. Similarly, in applications where it may be desirable to have a non-corrosive material, plastic materials may be employed.

Cooperating with the generally cylindrical wall of the housing 16 is an attaching means operating in conjunction with the threads 14 on the conduit 12. Thus, as shown in FIG. 3, the housing 10 is provided with a flange 24 extending outwardly from the side wall 20 of the housing 16; this flange portion 24 operating in conjunction with a separate attaching means as will be seen from the following description. This flange 24 provides an upwardly presented flat surface which serves as a shoulder, in a manner hereinafter described.

The attaching means may be any suitable means for the end use. Thus, the attaching means may operate in conjunction with the housing 16 and the conduit 12, and in a preferred embodiment may adopt the form of a hexagonal nut or so-called "hex" nut 26, having threads 28 on the inside surface. The hexagonal nut 26 preferably has an integrally formed flange 30 extending inwardly of its side walls. This flange 30 has a downwardly presented flat surface 32 adapted to mate with the upwardly presented flat surface or shoulder portion of the flange 24.

When the hexogonal nut 30 is threadedly secured to the threads 14 of the conduit 12, the flange 30 engages the shoulder 24 of the housing 16 so as to seal the housing 10 and conduit 12 together. As mentioned above, the attaching means preferably assumes the form of a hexagonal nut so that the outside surface of the hexagonal nut 26 thus presents a surface readily adaptable to be removed by mechanical means.

Associated with the housing 16 is a supporting means in the form of a diametrically extending support bar 34 which, in turn, will carry a diametrically extending support bar 34 which, in turn, will carry the adjustable mounting means of the present invention, as shown in FIG. 2. Similar to the housing 10, the supporting means 34 may be of any suitable material, e.g. metal, metal alloys, plastics, etc. Likewise, the overall configuration of the supporting means, e.g. the support bar 34 is not important to the device of the present invention. Thus, instead of a generally "bar" shaped support, a structure covering the entire open end of the housing 16 may be employed with apertures to permit pressure relief. In a preferred embodiment, the support bar 34 may be integral with the housing 16, and is also provided with an internally threaded central aperture (not shown).

The adjustable mounting means often referred to as the "adjustment means" of the present invention may be any means which serves the purpose of moving the rupturing means in to operative relationship with the rupturable disc membrane. In a preferred embodiment, as shown in the drawings, a general "bolt" like device having a threaded shaft 38 and a head 40 is provided.

The shaft 38 is adapted to move the head 40 into operative relationship to the rupturable disc membrane. Thus, the means of moving the shaft 38 may comprise threads adapted to operate in conjunction with and mate with those of the aperture within the support bar 34 as discussed hereinabove. The head 40 of the adjustable mounting means serves to provide a means of readily adjusting the position of the rupturing means. Thus, as shown in FIG. 2, the head 40 may be of a generally hexagonal configuration, so as to readily allow for adjustment by means of a suitable mechanical tool such as a wrench.

In place of having a threaded aperture within the support bar 34, there may be provided a separate device adapted to receive the adjustable mounting means. Thus, as shown in FIG. 3, there may be provided a further nut-like device generally indicated by reference numeral 42 adapted to receive the shaft 38 of the adjustable mounting means.

The rupturing means which is employed in the present invention, may be conventional and as such, are well known in the art. The rupturing means may be an integral part of the adjustable mounting means, or alternatively, it may be a separate unit adapted to be attached to the adjustable mounting means. As shown in FIG. 3, there is provided a rupturing means comprising a blade of a general apex configuration, which in a preferred embodiment, is an integral part of the adjustable mounting means, and preferably is centrally located on the adjustable mounting means. As previously discussed, the rupturing means of the present invention may be of any suitable material adapted to acquire and retain a sharp edge or point.

A rupturable disc membrane 46 is mounted between the housing 10 and conduit 12, so as to extend in a relatively flat planar section across the cylindrical conduit and housing. As discussed above, the disc membrane 46 is formed of a flexible material and is preferably a synthetic plastic material which is air impermeable and adapted to be held between the shoulder 24 of the housing 10 and the conduit 12 when the nut 26 is tightened.

In the illustrated embodiment of the present invention, shown in FIG. 3, there is also provided a vacuum breaker assembly indicated generally by reference numeral 48. Generally, the vacuum breaker assembly has a knife-like edge which is adapted to rupture or impale the rupture disc when it operates in a reverse direction as will be described hereinafter. Thus, there is provided an apex shaped edge 50; the vacuum breaker assembly being adapted to be held in a manner substantially identical to that of the flexible rupturable disc membrane 46. There also may be provided a sealing means between the vacuum breaker assembly and the housing 16. Thus, as shown in FIG. 3, a suitable gasket 48 of rubber or like material may be employed; this gasket being mounted on the peripheral portions of the conduit 12, between the conduit 12 and the vacuum breaker assembly 48.

In use, the device of the present invention is suitably attached to some system which operates under positive or negative pressure conditions, as for example, a pressure vessel. When ambient pressure conditions exist in the vessel, that is, when no force is exerted upon the rupturable disc membrane 46, this membrane will assume the position as illustrated in the solid lines of FIG. 3. However, if the pressure should increase within the system, such as the pressure vessel, a force will be imposed on the membrane 46, causing the latter to expand and assume a somewhat convex shape with respect to the vessel, in the manner as illustrated in the dotted lines of FIG. 3. When the pressure has reached a threshold level, the membrane will have expanded to a point where it engages the rupturing means. As this occurs, the membrane 46 will be ruptured or punctured thereby permitting the escape of air or other gas which created on the conditions leading to the threshold pressure level.

It should be observed, in connection with the present invention, that this threshold level can be uniquely adjusted by means of turning the bolt 38 so as to position the blade on the lower end thereof. Thus, by raising the bolt, it is possible to increase the threshold pressure level and by lowering the blade it is possible to decrease the threshold pressure level.

It can also be observed that the device of the present invention is uniquely adapted to operate under negative pressure conditions as well. In this case, the vacuum breaker assembly 48 could be adjustably positioned so as to provide an adjustable threshold pressure level. Furthermore, it is possible to slightly modify this device in order to reverse its position with respect to the conduit or other pressure source.

Thus there has been illustrated and described a unique and novel pressure release safety device which fulfills all of the objects and advantages sought therefor. It should be obvious that any changes, modifications, variations and other uses and applications would be obvious to those skilled in the art after considering this specification and the accompanying drawings. Therefore all such changes, modifications, variations and other uses and applications which do not depart from the nature and principle and spirit of this invention is deemed to be covered by the invention which is limited only by the following claim.

I claim:

1. A pressure relief safety device operational in a pressure range of from about 1 to about 5 pounds per square inch pressure and adapted to operate in conjunction with a substantially cylindrical conduit having a plurality of exteriorly presented threads at one end thereof, said device consisting essentially of

- a substantially cylindrical housing having an outwardly extending flange at one end thereof,
- an attaching member having a first cylindrical portion with interiorly presented threads adapted to mate with the threads on said one end of said cylindrical conduit and a second portion having an inwardly presented flange adapted to mate with the outwardly extending flange of said cylindrical housing to maintain the same in operative relationship to the conduit,
- a thin rupturable air impermeable membrane of a synthetic flexible plastic material retained between said housing and said conduit by said flanges,
- a support bar integral with said housing and extending diametrically thereof, said support bar being located at an end of the housing opposed to the end having the outwardly extending flange,
- a threaded aperture located centrally within said support bar,
- mounting means comprising a threaded member mating with the threads of said aperture, said mounting means having a head portion and a further portion,
- rupturing means associated with said mounting means and being located on said further portion of said mounting means, said head portion having means associated therewith for adjusting the rupturing means to a desired position such that when said flexible membrane shifts from a first position occupied when the pressure condition within the conduit is within a predetermined threshold level to a second position when the pressure conditions of said conduit traverse a predetermined threshold level within the range of from about 1 to about 5 pounds per square inch pressure, said rupturing means will contact and rupture said membrane, a one-piece vacuum breaker assembly comprising a cutting member and means extending therefrom to between said conduit and said housing to position said cutting member in a fixed operative centrally located relationship to the membrane on the side thereof opposed to the side on which said rupturing means are located, said mounting means further including means thereon for visually determining the position of said rupturing means with respect to said rupturable membrane.

* * * * *